March 3, 1964 S. BAYBICK ETAL 3,123,181
BRAKING MECHANISM FOR TAPE FEEDING APPARATUS
Filed May 5, 1961
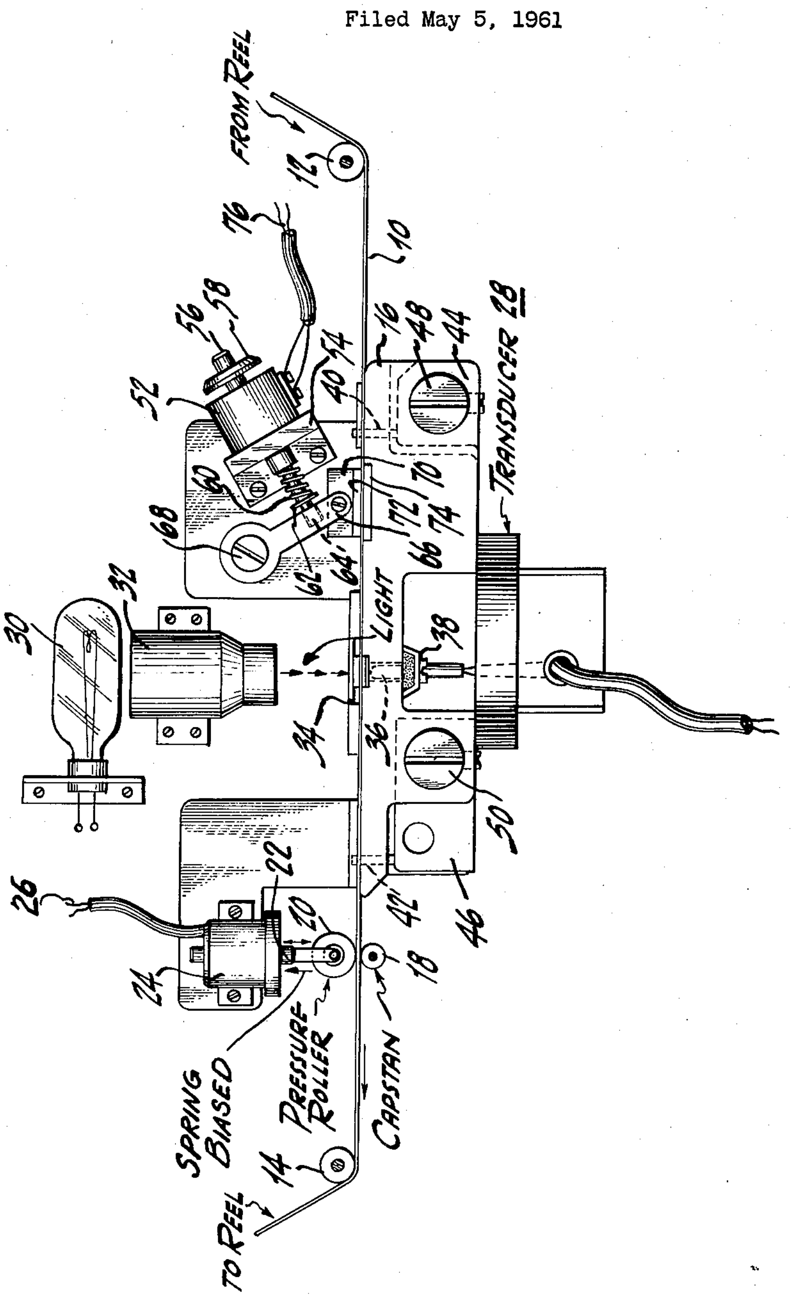
INVENTORS
SOLOMON BAYBICK
& STEVEN M. SHELLEY
BY
Attorney United States Patent Office 3,123,181 Patented Mar. 3, 1964

3,123,181

BRAKING MECHANISM FOR TAPE FEEDING APPARATUS

Solomon Baybick, Riverton, and Steven M. Shelley, Oaklyn, N.J., assignors to Radio Corporation of America, a corporation of Delaware Filed May 5, 1961, Ser. No. 108,033
5 Claims. (Cl. 188—65.1)

The present invention relates to apparatus for controlling the movement of a record tape, and more particularly to an improved braking system or mechanism for arresting the movement of a tape.

The invention is especially suitable for use in electronic data processing apparatus for handling a record tape which carries coded information. The features of the invention, however, are generally useful in controlling the movement of various media such as films, sheets and webs. The term "tape" is intended to include films, sheets, webs and the like, wherever appropriate.

In high speed record tape handling devices, such as paper tape readers, the tape travels at high speed and it repeatedly started and stopped in response to command signals from a computer or other information utilization device. The tape is desirably stopped between successive coded characters which are represented thereon in order to prevent loss of information. For example, in a paper tape reader which reads information at the rate of one thousand characters per second, the tape must be stopped within one-half millisecond after receipt of a command signal to prevent loss of information.

Braking systems which respond with sufficient rapidity to stop high speed tape between successive characters are presently available. However, presently known systems are relatively expensive, since they utilize low inertia electromagnetic devices which are high in cost.

It is an object of the present invention to provide an improved braking system for tape feeding apparatus which is capable of arresting the tape.

It is a further object of the present invention to provide an improved braking system capable of rapidly stopping a tape which is moving at high speed, which system is less complicated and lower in cost than known braking systems having similar operating characteristics.

Briefly described, a braking system in accordance with the invention includes a block over which the tape passes and a brake shoe which is movable to pinch the tape against the block. The brake shoe is self-energizing for tape movement in a desired direction. For example, the shoe may be pivotally mounted on an arm which rotates in the direction of tape movement into engagement with the tape.

The brake shoe may normally be disposed in sliding engagement with the tape so as to tension the tape while it is driven by associated tape drive means, such as a capstan and pressure roller. An electromagnetic device is provided for urging the shoe into gripping relationship with the tape. Since the braking shoe is self-energizing, the tape, itself, pulls the brake shoe into braking relationship with the tape. The braking action is rapid, since braking is aided by the fast moving tape. The electromagnetic device which is used may be of a relatively inexpensive type, since the electromagnetic device need only apply a light force and move the brake shoe a very short distance so as to change the relationship of the brake shoe to the tap from sliding to gripping relationship.

The invention itself, both as to its organization and method of operation, as well as additional objects and advantages thereof, will become more readily apparent from a reading of the following description in connection with the accompanying drawing, in which the sole figure is a diagramamtic representation of a tape feeding apparatus incorporating a braking system in accordance with the invention.

Referring more particularly to the drawing, there is shown a tape reader using a punched record tape 10. This tape may be a paper tape having successive rows of holes. Each row of holes corresponds to a character of digital information and each hole corresponds to a bit of that character. Different alphanumeric characters are specified by different combinations of holes in each row. The tape is fed from right to left, as viewed in the drawing, from a supply reel (not shown) to a take-up reel (not shown). Loops forming idlers or tape accumulating bins (not shown) may precede the supply reel and the take-up reel in order to provide a substantially tensionless length of the tape between a pair of guide rollers 12 and 14.

The tap is driven across a block member 16 by a capstan 18 with which a pressure roller 20 cooperates. The capstan 18 is continuously driven at constant speed by an electric motor (not shown). The pressure roller is connected to the armature 22 of a solenoid 24. Spring biasing means (not shown) may be provided for normally biasing the pressure roller out of engagement with the tape 10. When the solenoid 24 is energized by command signals applied thereto by way of input leads 26, the pressure roller pinches the tape against the capstan so that the capstan may drive the tape.

In a paper tape reader constructed in accordance with the invention, the tape may be driven at high speed (for example, one hundred inches per second) so that characters may be read from the tape at the rate of at least one thousand characters per second. The characters are read from the tape by a transducer 28 which has optical and electrical elements. The transducer includes an exciter lamp 30, a lens system 32, a mask 34 and a plurality of photo-diodes 36. Light from the lamp 30 is imaged by the lens system 32 on the paper tape 10 at the mask 34. The mask 34 has a plurality of holes crosswise of the tape corresponding in position to the columns of holes in the paper tape. A separate photo-diode 36 is located behind each hole in the mask. The photo-diodes are positioned in the block 16 by means of an adjustable bracket for alignment of the photo-diodes with the holes in the mask 34. The tape is positioned by fingers 40 and 42 disposed to the right and to the left of the mask (as viewed in the drawing), respectively, so that the columns of holes therein will be in alignment with the holes in the mask 34. These fingers are adjustably mounted on brackets 44 and 46. The brackets 44 and 46 are held on the block member 16 by screws 48 and 50. The positions of the fingers 40 and 42 are adjustable by means of the screws 48 and 50.

Light rays passing through corresponding holes in the mask 34 and tape 10 are translated into electric signals by the photo-diodes 36.

The braking system in accordance with the invention includes a solenoid 52 mounted on an L-shaped bracket 54. The solenoid includes an armature 56 which extends axially through the solenoid. A disc 58 on the rear end of the armature 56 limits movement of the armature to the left. A compression spring 60, which is loosely wound on the armature 56, bears against a stop 62 fastened to the armature 56. Accordingly, the armature 56 is biased to the left by the spring 62. The armature fits loosely into a hole 64 in an arm 66 which is pivotally mounted at one end on a pivot 68. A brake shoe 70 is fixedly secured to the opposite end of the arm 66. This brake shoe is a metal block having a lining 72 of resilient plastic at the bottom thereof. This lining is desirably a tetrafluoroethylene polymer, such as sold under the trade name "Teflon" by the E. I. du Pont de Nemours & Co. of Wilmington, Delaware. The brake shoe 70 is oriented with respect to the arm so that the surface of the lining 72 generally parallels the path of the tape 10. The block 16 is recessed under the shoe 70. A metal block 74 is inserted in the recess in the block 16.

A radial line from the axis of the pivot 68 to the face of the lining 72 along the arm 66 is longer than the direct or perpendicular distance from the pivot 68 axis to the tape. The pivot 68 is also spaced to the left of, or in the direction of tape travel from, the shoe 70. Accordingly, the arm 66 and shoe 70 can swing along an arc in the direction of tape travel. This arrangement makes the brake shoe 70 self-energizing in its action for movement of the tape from right to left as shown in the drawing. Self-energizing braking action is used in the operation of the braking system to provide for rapid braking of the tape. The self-energizing braking arrangement also permits the use of a low cost, weak solenoid having a relatively slow response to obtain the same or a faster response than in prior, more expensive arrangements.

In operation, the spring 60 is under compression and biases the shoe 70 into sliding engagement with the tape. The bias force exerted by the spring is insufficient to cause the brake shoe 70 to grip the tape. The biasing force is, however, sufficient to prevent the brake shoe 70 from bouncing up and down as the tape moves from right to left. Accordingly, a slight drag is exerted on the tape 10. The capstan 18 now pulls the tape against a load which includes primarily the drag of the shoe 70. The tape between the capstan and brake shoe is therefore under tension as it passes the transducer 28. Wrinkles in the tape which might cause reflection of the light at the transducer 28 are eliminated by the tape tensioning provided by the brake shoe 70. The Teflon lining 72 of the shoe 70 facilitates the sliding engagement of the tape with the shoe 70 because Teflon has a waxy surface.

When a command signal is applied across a pair of leads 76 which are connected to the solenoid 52, the solenoid 52 is energized and the armature 56 applies a force against the arm 66. This force is transmitted to the brake shoe 70 to urge the brake shoe into gripping engagement with the tape. Since the braking action is self-energizing, the brake shoe is urged with a force greater than the force applied by the solenoid against the tape. The braking force is multipled several times. The armature 56 need move only a slight distance to bring the shoe 70 into gripping engagement with the tape. Since the armature moves a very short distance for braking, the braking can be effected very rapidly after application of a command signal to the leads 76. The response time and braking force obtained from the solenoid 52 is therefore equal to the response time and braking force obtainable from a solenoid which is larger, faster acting and, therefore, more expensive than the solenoid 52.

From the foregoing description, it will be apparent that there has been provided an improved braking system for tape feeding apparatus. While the braking system has been described as incorporated in a paper tape reader, it will be appreciated that a braking system having the above described features of the invention will be generally useful in arresting movement of other forms of tape as well. Variations in the component parts of the illustrated system will, no doubt, also be obvious to those skilled in the art. For example, the general shape of the arm and the brake shoe may be modified and these members made as a unitary member. Accordingly, the foregoing description should be taken as illustrative and not in any limiting sense.

What is claimed is:

1. In apparatus for feeding a record tape in one direction along a path, a braking mechanism which comprises a fixed block past which said tape passes and a brake shoe, said block and shoe being disposed on opposite sides of said tape, means pivotally mounting said brake shoe on an axis spaced from said block in the direction of feeding of said tape for movement toward said block and in the direction of feeding of said tape to pinch said tape between said shoe and said block, means for continuously biasing said shoe into sliding relationship with said tape, and other means coupled to said shoe for applying a force to said shoe aiding the bias of said biasing means for bringing said shoe into gripping relationship with said tape.

2. In apparatus for feeding a record tape along a path, a braking mechanism which comprises a fixed brake block past which said tape passes, a brake shoe, said shoe and said block being disposed on opposite sides of said path, an arm pivotally mounted on an axis spaced from said block in the direction of movement of said tape, said axis being spaced from said path a distance less than the length of said arm, said shoe being mounted on the end of said arm whereby said mounted shoe is self-energizing for movement of said tape in said direction, a solenoid device having an armature in engagement with said arm, a compression spring around said armature biasing said arm in said direction with a force sufficient only to urge said shoe into sliding engagement with said tape to thereby effect a predetermined, continuous drag on said tape, and means for energizing said solenoid device for increasing the force on said arm in the direction of said biasing force to urge said shoe into gripping relation with said tape.

3. The invention as set forth in claim 2 including a lining of resilient material on the tape engaging face of said shoe.

4. The invention as set forth in claim 3 wherein said material is a tetrafluorethylene polymer.

5. In apparatus for feeding a record tape in a given direction along a path, a braking mechanism which comprises a fixed block past which said tape passes and a brake shoe disposed in cooperating relationship on opposite sides of said path, means pivotally mounting said shoe about an axis spaced in said given direction along said path from at least a portion of said shoe whereby said shoe, so pivotally mounted, is self-energizing for movement of said tape in said given direction, an electromagnetic device having an armature coupled to said shoe, spring means for biasing said shoe into sliding engagement with said tape to thereby effect a predetermined, continuous drag on said tape, and means for energizing said device to increase the biasing force and to urge said shoe into gripping relation with said tape.

References Cited in the file of this patent

UNITED STATES PATENTS

| | | |
|---|---|---|
| 1,822,770 | Eitzen | Sept. 8, 1931 |
| 1,976,471 | Adams | Oct. 9, 1934 |
| 2,568,431 | Congdon | Sept. 18, 1951 |
| 2,838,250 | Stavrakis | June 10, 1958 |
| 2,864,609 | Trimble | Dec. 16, 1958 |
| 2,877,012 | Angel et al. | Mar. 10, 1959 |
| 2,923,380 | Selsted | Feb. 2, 1960 |
| 2,960,280 | Connelly | Nov. 15, 1960 |
| 3,002,671 | Brumbaugh | Oct. 3, 1961 |

UNITED STATES PATENT OFFICE
CERTIFICATE OF CORRECTION

Patent No. 3,123,181 March 3, 1964

Solomon Baybick et al.

It is hereby certified that error appears in the above numbered patent requiring correction and that the said Letters Patent should read as corrected below.

Column 1, line 23, for "it" read -- is --; line 68, for "tap" read -- tape --; column 2, line 3, for "diagramamtic" read -- diagrammatic --; line 20, for "tap" read -- tape --.

Signed and sealed this 7th day of July 1964.

(SEAL)
Attest:

ERNEST W. SWIDER
Attesting Officer

EDWARD J. BRENNER
Commissioner of Patents